May 19, 1936.    I. A. MORBERG    2,041,082
THREAD CUTTING TOOL
Filed Oct. 6, 1934

INVENTOR
*I. A. MORBERG*
BY *H. A. Whitehorn*
ATTORNEY

Patented May 19, 1936

2,041,082

UNITED STATES PATENT OFFICE 2,041,082

THREAD CUTTING TOOL

Ivar A. Morberg, Chicago, Ill., assignor to Western Electric Company, New York, N. Y., a corporation of New York Application October 6, 1934, Serial No. 747,145

2 Claims. (Cl. 10—140)

This invention relates to thread cutting tools and more particularly to thread chaser dies or taps for cutting threads in articles.

An object of the invention is to provide a thread cutting tool for cutting threads in articles and for removing the first thread or feather edge therefrom.

In accordance with the object, one embodiment of the invention contemplates a thread cutting tool having thereon a number of cutters which are adapted to operate on an article to be threaded, the remainder of the tool being of the same diameter as the thread root diameter of the threads to be cut so that the first thread is cut off square and the usual feather edge is eliminated.

Other objects and advantages will be apparent from the following detailed description taken in conjunction with the accompanying drawing, wherein Fig. 1 is a fragmentary sectional view of a thread cutting tool and an article showing their relative positions near the completion of a threading operation;

Figure 3:
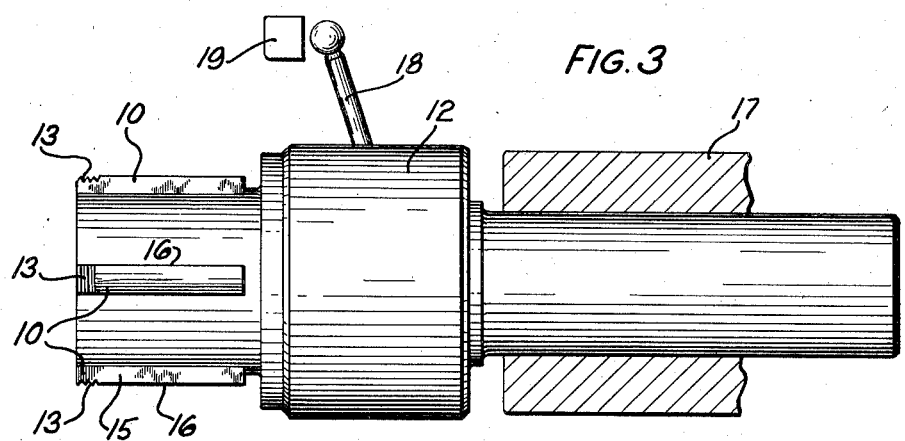
Fig. 3 is a side elevational view of a collapsing pipe tap with a set of threading tools mounted therein in the conventional manner.
Figure 4:
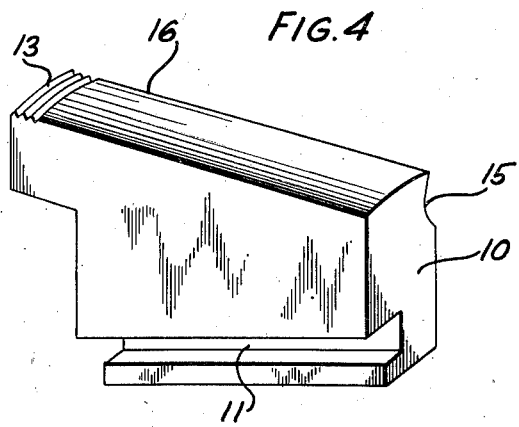
Fig. 4 is a perspective view of one of the thread cutting tools.

Referring now to the drawing wherein like reference numerals designate similar parts throughout the views, numeral 10 designates a thread chaser which is standard in general contour and is provided with a tongue and groove portion 11 adjacent its inner surface for interengaging the mechanism of a standard collapsing tap, such as the one indicated at 12 in Fig. 3, so that a set of the thread chasers 10, which in the present instance is four in number, may simultaneously be moved inwardly away from the work at a predetermined time during a threading operation. The thread chasers which constitute the set are identical in construction with the exception that the threads 13 are formed thereon in such sequence that they will accurately form threads in an article to be threaded.

In the present instance for the purpose of illustration, only three threads are shown on the thread chasers assuming that only three threads are desired in the article indicated at 14. The remainder of the surfaces of the thread chasers has the same diameter as the thread root diameter of the threads to be cut. The forming of the cutting face angle 15 along each of the thread chasers forms a toothed cutting edge at the threads 13 and a straight cutting edge 16 for the remainder of the length of each of the thread chasers.

During the threading of the article 14, the article is mounted in a chuck (not shown) which is rotated continuously during a threading operation. The collapsing tap 12 is mounted in a carriage 17 which is moved toward the work at a predetermined rate of speed by any suitable mechanism (not shown) during the threading operation to move the thread chasers carried by the collapsing tap into engagement with the inner portion of the article 14 to cut the desired number of threads therein. The movement of the carriage 17, which is preferably of a conventional type of threading machine, may be limited, as for example in the present illustration it is preferred that the movement thereof be limited to the depth of four threads. During the threading operation, therefore, four threads will be cut in the article but during the cutting of the fourth thread the straight cutting edge 16 of one of the thread chasers will cut off the first thread which has been cut and which tapers down to a feather edge. Obviously only one of the thread chasers needs to be provided with a cutting edge 16. They may, however, be made substantially alike, as shown, and the one, the edge 16 of which is most advanced, will do the work of removing the feather edge. When the threading operation has been completed, that is when four threads have been cut in the article and the first thread has been removed by the cutting edge 16 of one of the thread chasers, leaving only three threads in the article, a conventional tripping lever 18 strikes a stop 19 to actuate the mechanism for collapsing or drawing inwardly the thread chasers to move them out of engagement with the article 14 to permit rearward movement of the tap 12. This mechanism is old and well known in the art and it is believed that a detailed description and detailed illustration thereof is not necessary.

Figure 1:
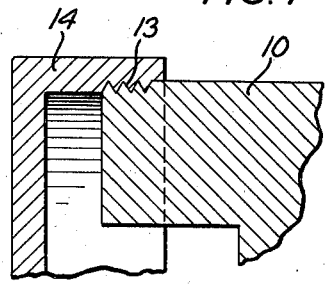
Figure 2:
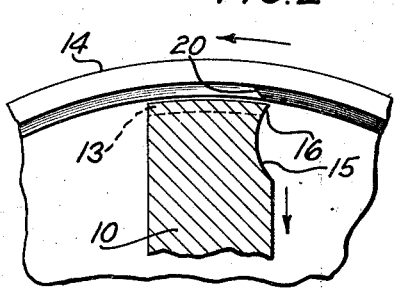
Fig. 2 is a fragmentary sectional view of a thread cutting tool and an article which has been threaded showing their relative positions at the completion of a threading operation.

The article 14 continues to rotate during the collapsing of the thread chasers causing the thread chaser which severs the first thread from the article to sever the material, which previously constituted the first thread, from the article at an angle as illustrated at 20 in Fig. 2. The cutting of the material constituting the first thread of the article is continued during the collapsing of the thread chasers until it is completely severed from the article (Fig. 2). As a result, the first thread which starts with a feather edge and gradually becomes wider until it reaches the complete width of the threads has been removed from the article, leaving the outer end of the threads tapered and of full dimension so that a companion article may be easily threaded thereinto.

In the present embodiment of the invention thread chasers have been illustrated for internally cutting threads in an article.

In a similar manner thread chasers for cutting external threads may be formed so that a desired number of threads may be formed upon an article and the first thread removed therefrom. During the external threading of an article the thread chasers may be carried by a die head and during the opening of the die head, which will cause the thread chasers to move outwardly away from the article while the latter continues to rotate, the thread chaser which severed the first thread from the article would completely remove it therefrom in the same manner as is illustrated in Fig. 2.

Figure 5:
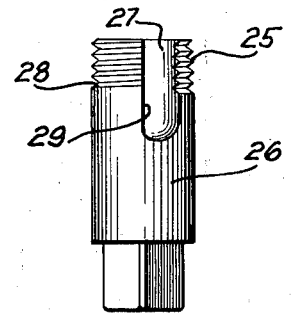
Fig. 5 is an elevational view of a single tap illustrating the invention.

In threading smaller articles where thread chasers cannot be used and a single tap is employed, the construction of the tap will be as illustrated in Fig. 5. In this illustration the tap is provided with threads 25 at its outer end. The shoulder 26 of the tap is of the same diameter as the thread root diameter of the threads to be cut. A plurality of flutes 27 (only one being shown) in the tap form cutting edges 28 for the threads 25 and at least one straight cutting edge 29 is provided in the shoulder 26. During the cutting of threads in an article with the tap illustrated in Fig. 5, the desired number of threads are formed in the article and during the forming of the last thread the first thread is removed from the article by the cutting edge 29. Since in this form of the invention the portion of the thread which is removed is broken off from the remaining thread, it may be desirable sometimes to smooth the broken end by a hand tool or otherwise.

It will be understood that the nature and embodiment of the invention herein described and illustrated is merely a convenient and useful form of the invention and many changes and modifications may be made therein without departing from the spirit and scope of the invention.

What is claimed is:

1. A thread forming tool having a predetermined number of cutting threads formed in one surface thereof for cutting threads in an article while rotating, means for moving the thread forming tool relative to the article in one direction for causing threads to be cut therein, cutting means disposed adjacent the last cutting thread for cutting a predetermined portion of the first formed thread from the article, and means for moving the cutting tool relative to the article at right angles to the said direction for causing the cutting edge to sever the previously cut thread portion from the threads remaining in the article.

2. In a thread forming device, a set of thread chasers having a predetermined number of cutting threads in their peripheral surfaces, a cutting edge disposed adjacent the last cutting thread of certain of the thread chasers, a member for supporting the thread chasers, means for moving the member relative to an article to be threaded for causing the thread chasers to cut threads in the article during the rotation thereof, the cutting edge being constructed and arranged so that during the cutting of the last thread said cutting edge trims from the article the usual tapered thread portion formed at the beginning of the first formed thread, and means for moving the thread chasers away from the article, the movement of the thread chasers away from the article causing the cutting edge to sever the previously cut tapered thread portion from the remaining threads of the article.

IVAR A. MORBERG.